United States Patent
Ouyang

(10) Patent No.: US 8,409,738 B2
(45) Date of Patent: Apr. 2, 2013

(54) BATTERY COVER LATCHING ASSEMBLY

(75) Inventor: Zhi-Bin Ouyang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 690 days.

(21) Appl. No.: 12/607,304

(22) Filed: Oct. 28, 2009

(65) Prior Publication Data

US 2010/0216003 A1 Aug. 26, 2010

(30) Foreign Application Priority Data

Feb. 26, 2009 (CN) .......................... 2009 1 0300562

(51) Int. Cl.
*H01M 2/10* (2006.01)
(52) U.S. Cl. ...................... 429/97; 361/679.58; 361/759
(58) Field of Classification Search .................. 429/100, 429/96, 97; 361/679.58, 759, 801; 455/575.8
See application file for complete search history.

(56) References Cited

U.S. PATENT DOCUMENTS

| | | | | |
|---|---|---|---|---|
| 7,476,462 B2* | 1/2009 | Song et al. | ........................ | 429/97 |
| 7,510,796 B2* | 3/2009 | Tokano | ............................ | 429/96 |
| 7,751,181 B2* | 7/2010 | Chen | ........................ | 361/679.01 |
| 7,811,698 B2* | 10/2010 | Tu et al. | ........................... | 429/98 |
| 8,163,417 B2* | 4/2012 | Wang | ............................ | 429/100 |
| 8,223,490 B2* | 7/2012 | Dong | ........................ | 361/679.58 |
| 8,248,812 B2* | 8/2012 | Xiong | ........................... | 361/759 |
| 8,252,442 B2* | 8/2012 | Shi et al. | ......................... | 429/97 |
| 8,257,853 B2* | 9/2012 | Dong | ............................ | 429/97 |
| 2007/0026297 A1* | 2/2007 | Qin et al. | ........................ | 429/97 |
| 2007/0048599 A1* | 3/2007 | Choi | ............................ | 429/97 |
| 2010/0021803 A1* | 1/2010 | Wang | ............................ | 429/100 |
| 2010/0062324 A1* | 3/2010 | Ooyama | ........................ | 429/97 |
| 2010/0151304 A1* | 6/2010 | Dong | ............................ | 429/97 |
| 2010/0151305 A1* | 6/2010 | Ouyang | ............................ | 429/97 |
| 2010/0247995 A1* | 9/2010 | Chang | ............................ | 429/100 |
| 2011/0020684 A1* | 1/2011 | Liang et al. | .................... | 429/100 |
| 2011/0033740 A1* | 2/2011 | Zhang | ............................ | 429/100 |
| 2011/0139527 A1* | 6/2011 | Bannier et al. | ................ | 180/68.5 |
| 2011/0183174 A1* | 7/2011 | Ouyang | ............................ | 429/97 |
| 2011/0195292 A1* | 8/2011 | Ouyang | ............................ | 429/100 |
| 2011/0318622 A1* | 12/2011 | Hsiung | ............................ | 429/100 |
| 2012/0064384 A1* | 3/2012 | Cao | ................................ | 429/100 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

A battery cover latching assembly is provided. The battery cover latching assembly includes a body member defining a battery receiving space, a battery cover being attached to the body member to cover the battery receiving space, and a latching assembly. The battery cover includes a stopping block. The latching assembly includes a button. The button includes a latch block. The button is rotatably mounted to the body member to lock the latch block to the stopping block or release the latch block from the stopping block.

20 Claims, 4 Drawing Sheets and # BATTERY COVER LATCHING ASSEMBLY

BACKGROUND

1. Technical Field

The present disclosure relates to battery cover latching assemblies and, particularly, to a battery cover latching assembly used in a portable electronic device.

2. Description of Related Art

Battery cover latching assemblies are usually provided to secure and allow required access to batteries of portable electronic devices.

A typical battery cover latching assembly for an electronic device usually includes a pair of hooks on one end of a battery cover of the electronic device and a locking pin on the other end of the battery cover. Correspondingly, a pair of grooves is defined in a housing of the electronic device. A locking hole corresponding to the locking pin is also defined in the housing. By attaching the battery cover onto the housing, the hooks can enter into the grooves, and the locking pin is securely latched into the locking hole. Thus, the battery cover is secured to the housing.

However, to detach the battery cover, an external force is needed due to the tight latching of the locking pin into the locking hole. Thus, the battery cover may be damaged, which makes it inconvenient to replace the locked battery.

Therefore, there is room for improvement within the art.

BRIEF DESCRIPTION OF THE DRAWINGS

Many aspects of the battery cover latching assembly can be better understood with reference to the following drawings. These drawings are not necessarily drawn to scale, the emphasis instead being placed upon clearly illustrating the principles of the present battery cover latching assembly. Moreover, in the drawings like reference numerals designate corresponding sections throughout the several views.

DETAILED DESCRIPTION

Figure 1:
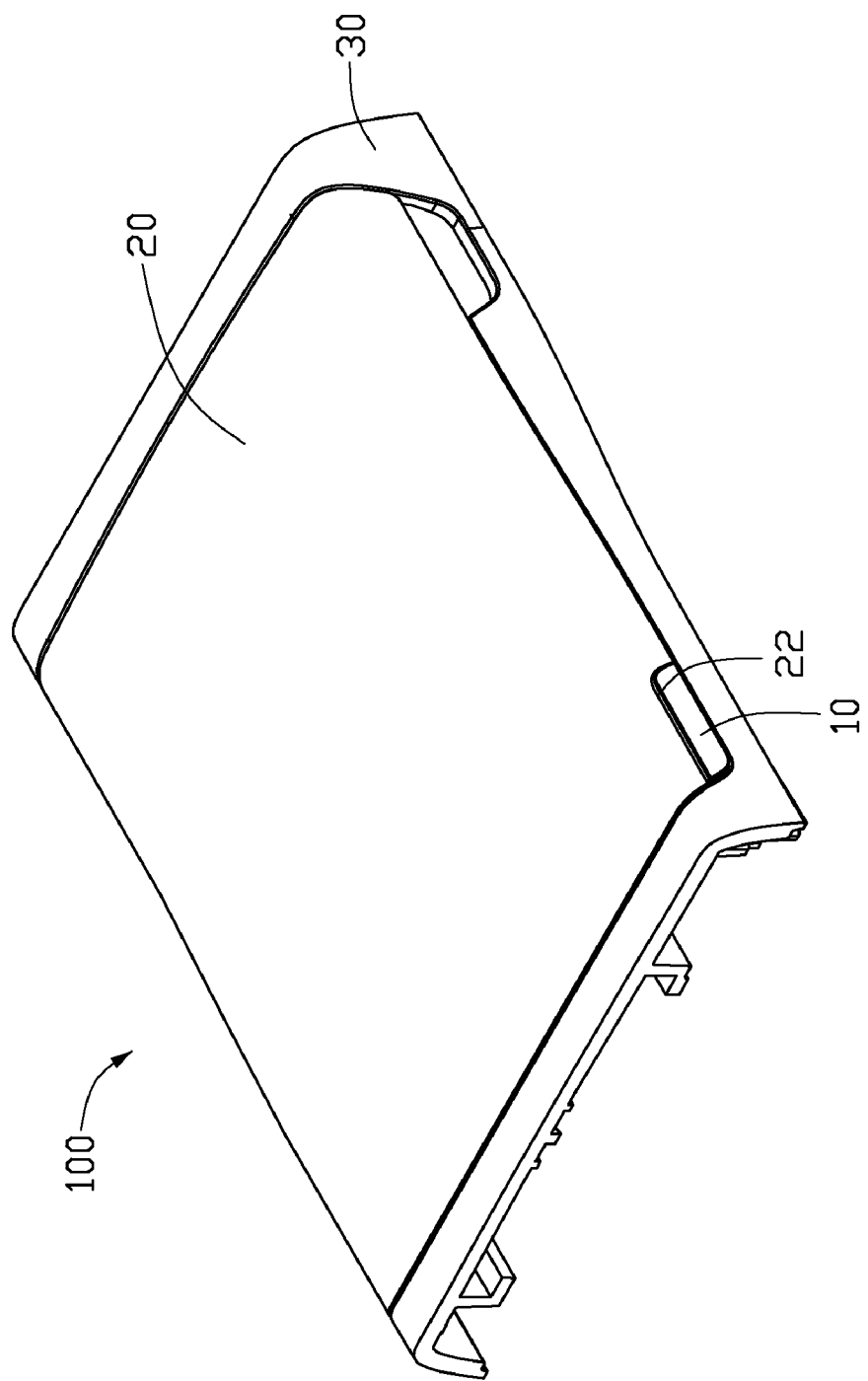
FIG. 1 is an assembled view of a battery cover latching assembly, in accordance with an exemplary embodiment.
Figure 2:
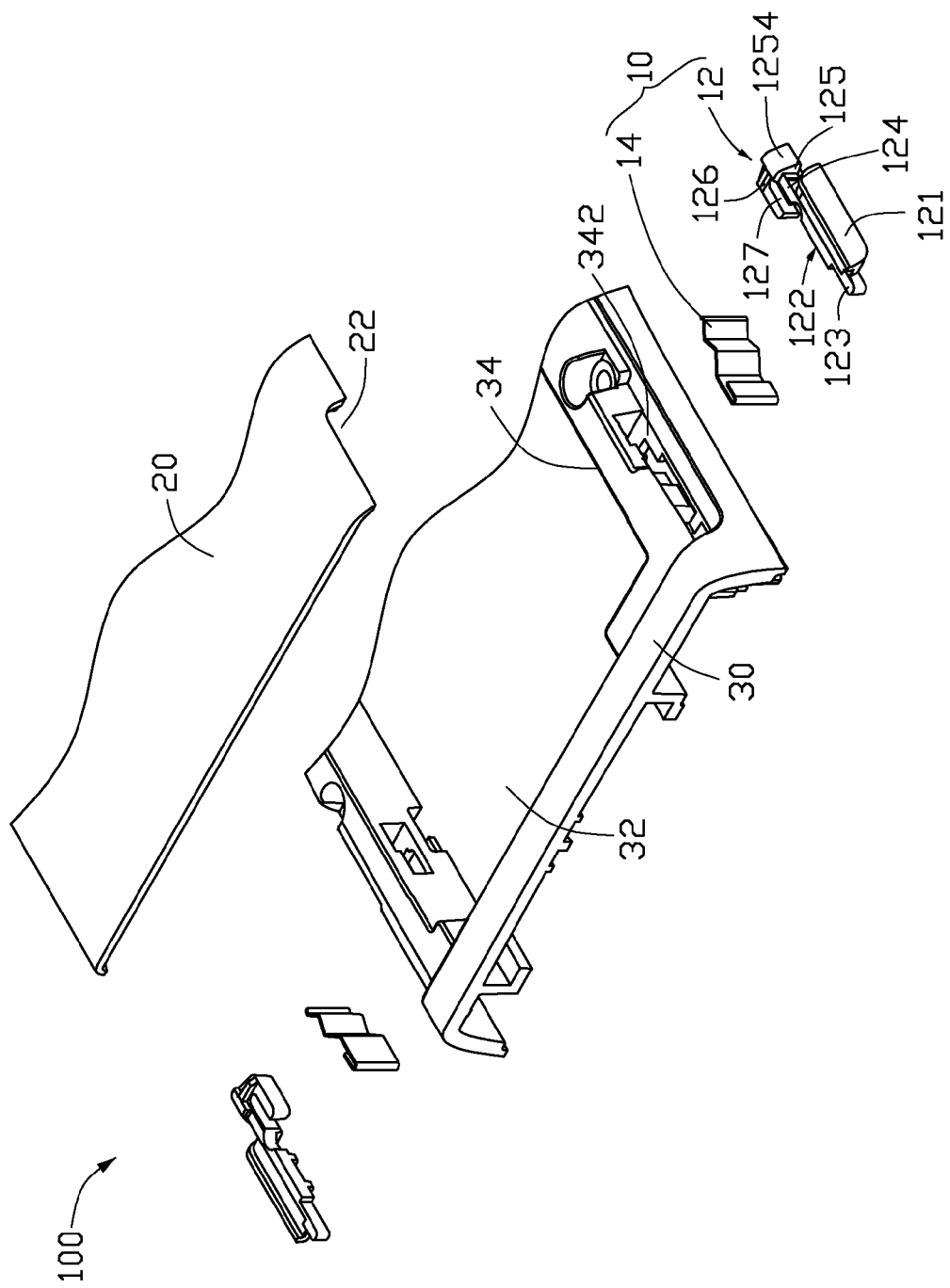
FIG. 2 is an exploded, isometric view of the battery cover latching assembly shown in FIG. 1.

FIGS. 1 and 2 show an exemplary battery cover latching assembly 100 for portable electronic devices, such as mobile phones, digital cameras and etc. The battery cover latching assembly 100 includes two latching assemblies 10, a battery cover 20, and a body member 30. The latching assemblies 10 are rotatably mounted to the body member 30, configured for releasably latching the battery cover 20 to the body member 30.

Figure 3:
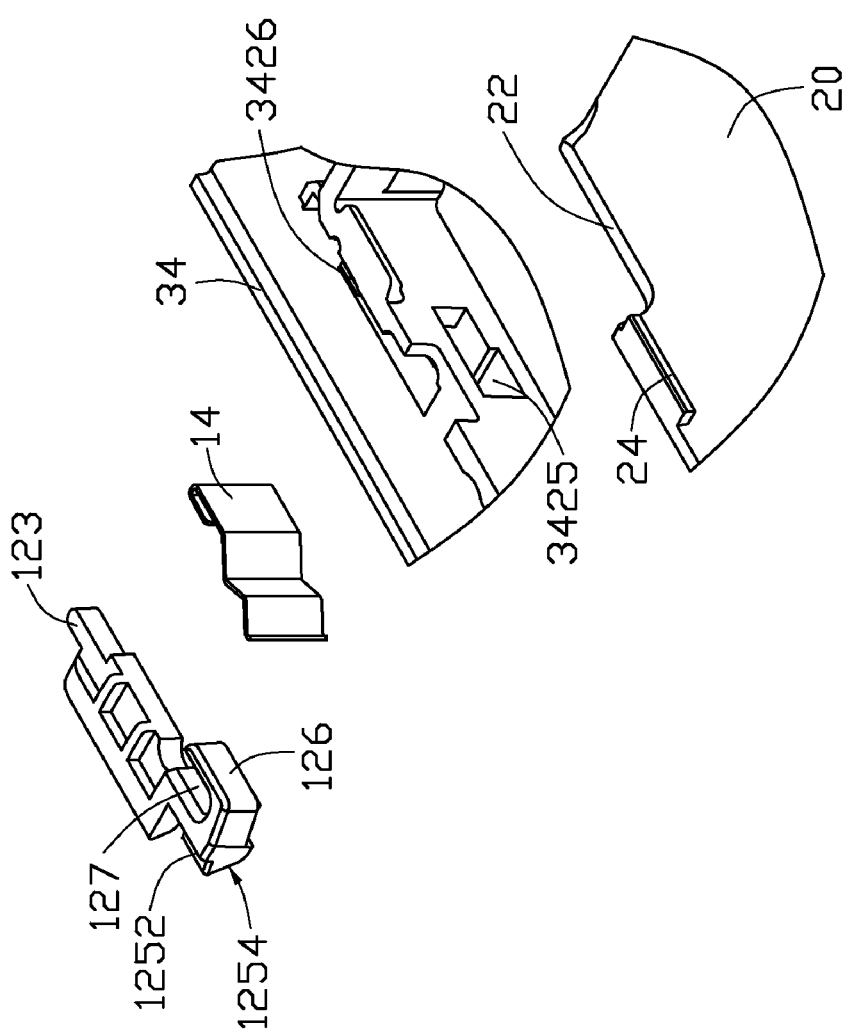
FIG. 3 is similar to FIG. 2, but viewed from another aspect.

Each latching assembly 10 includes a button 12 and an elastic member 14. The button 12 includes a first surface 121 and a second surface 122 opposite to the first surface 121. The first surface 121 is for being pressed. A securing portion 123 protrudes from one end of the button 12. A connecting portion 124 protrudes from an opposite end of the button 12. The securing portion 123 and the connecting portion 124 may be adjacent to the second surface 122. A latch block 125 protrudes from one side of the connecting portion 124 facing the first surface 121. In this embodiment, the latch block 125 is a wedge-shaped block. Referring to FIGS. 2 and 3 together, the latch block 125 includes a wedge-shaped surface 1254 and a latch slot 1252. The wedge-shaped surface 1254 faces away from the latch slot 1252. The latch slot 1252 is defined in a wall of the latch block 125 opposite to the wedge-shaped surface 1254. The battery cover 20 slides into the latch slot 1252 guided by the wedge-shaped surface 1254. A first clamp block 126 protrudes from the other side of the connecting portion 124 opposite to the latch block 125. The first clamp block 126 and the connecting portion 124 define a first clamp space 127 for clamping one end of the elastic member 14.

The elastic member 14 is a waved sheet. One end of the elastic member 14 is latched in the first clamp space 127, the other end of the elastic member 14 is clamped to the body member 30. The elastic member 14 provides a force to rebound the button 12 to an original state.

The battery cover 20 defines a cutout 22, corresponding to the button 12. The button 12 is received in the cutout 22. A stopping block 24 protrudes from an inside of the battery cover 20, adjacent to the cutout 22. The stopping block 24 corresponds to the latch block 125. The stopping block 24 is latched in the latch slot 1252.

Figure 4:
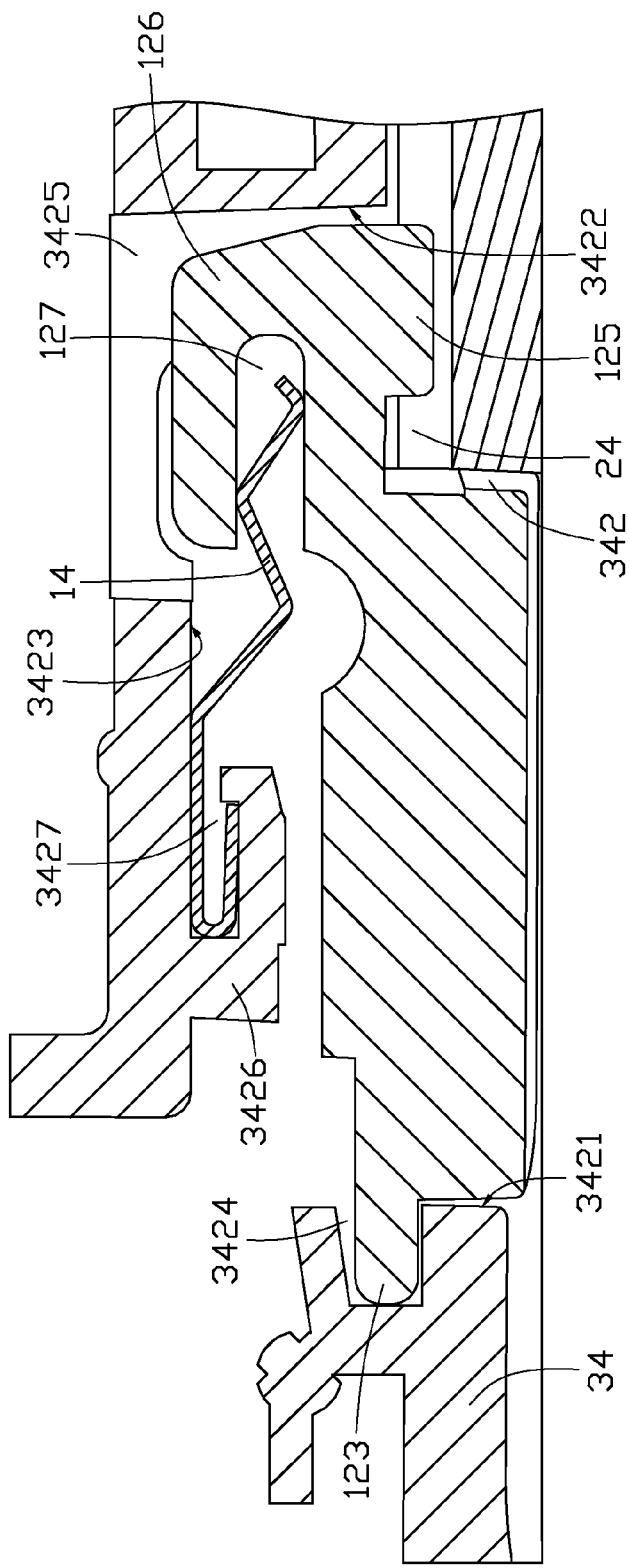
FIG. 4 is a cross-sectional view of the battery cover latching assembly shown in FIG. 4.

The body member 30 defines a receiving cavity 32 to receive a battery (not shown). The receiving cavity 32 is surrounded by two opposite sidewalls 34. Referring to FIGS. 2 and 4 together, each sidewall 34 defines a groove 342, corresponding to the latching assembly 10. The groove 342 is surrounded by a first wall 3421, a second wall 3422, a third wall 3423. The second wall 3422 is opposite to the first wall 3421. The first wall 3421 defines a securing hole 3424 for securing the securing portion 123. The third wall 3423 defines an channel 3425 aligned with the first clamp block 126. The clamp block 126 can be moveably received in the channel 3425. A second clamp block 3426 protrudes from one end of the third wall 3423 adjacent to the first wall 3421 (see FIG. 4). The second clamp block 3426 and the third wall 3423 define a second clamp space 3427, facing the second wall 3422. The second clamp space 3427 clamps the other end of the elastic member 14.

Referring to FIG. 4, during assembly, one end of the elastic member 14 is clamped in the first clamp space 127 of the button 12. The button 12 and the elastic member 14 are inserted into the groove 342. At this time, the securing portion 123 is latched in the securing hole 3424, and the other end of the elastic member 14 is clamped in the second clamp space 3427. Thus, the latching assembly 10 is stably mounted in the body member 30.

To latch the battery cover 20 to the body member 30, the battery cover 20 is positioned over the battery receiving space 32. The battery cover 20 is pressed towards the body member 30. During this stage, each stopping block 24 is slid along a corresponding wedge-shaped surface 1254 to push the latch block 125 inwardly. The button 12 is rotated by the stopping block 24 about the securing portion 123 until the first clamp block 126 and the latch block 125 enter into the body member 30. At this time, the first clamp block 126 is received in the channel 3425, and the elastic member 14 accumulates an elastic force. The battery cover 20 is continued to be pressed until the stopping blocks 24 go over the wedge-shaped surface 1254. Then the battery cover 20 is released, and the button 12 is rebounded by the elastic force to drive the stopping blocks 24 to latch into the latch slots 1252.

To release the battery cover 12, the button 12 is pressed to be rotated about the securing portion 123 until the first clamp block 126 and the latch block 125 enter into the body member 30. During this process, the first clamp block 126 is received in the channel 3425, and the elastic member 14 accumulates an elastic force. The button 12 is continued to be pressed until the stopping blocks 24 is completely released from the latch block 125. Thus, a user can easily detach the battery cover 20 from the body member 30.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching assembly, comprising:
   a body member defining a battery receiving space and a securing hole;
   a battery cover being attached to the body member to cover the battery receiving space, the battery cover including a stopping block; and
   a latching assembly including a button mounted to the body member, the button being an integral part and including a latch block and a securing portion integrally formed together, the latching block protruding from one end of the button and being releasable locked to the stopping block, the securing portion protruding from an opposite end of the button and being received in the securing hole, the button can be pressed to force the latch block to deflect around the securing portion to allow the latch block to be released relative to the stopping block.

2. The battery cover latching assembly as claimed in claim 1, wherein the body member defines a groove, the latching assembly is received in the groove.

3. The battery cover latching assembly as claimed in claim 2, wherein the groove is surrounded by a first wall, a second wall, and a third wall, the second wall is opposite to the first wall.

4. The battery cover latching assembly as claimed in claim 3, wherein the securing hole is defined in the first wall, the securing portion can be rotatably received in the securing hole.

5. The battery cover latching assembly as claimed in claim 1, wherein the latching assembly further includes an elastic member, the elastic member provides a force to rebound the button.

6. The battery cover latching assembly as claimed in claim 5, wherein a first clamp block protrudes from the connecting portion, the first clamp block and the button define a first clamp space for clamping one end of the elastic member.

7. The battery cover latching assembly as claimed in claim 6, wherein a second clamp block protrudes from the third wall, the third wall and the second clamp block define a second clamp space for clamping the other end of the elastic member.

8. The battery cover latching assembly as claimed in claim 6, wherein the third wall defines a channel, the first clamp block is moveably received in the channel.

9. The battery cover latching assembly as claimed in claim 3, wherein the latch block includes a wedge-shaped surface for guiding the stopping block to latch with the latch block.

10. The battery cover latching assembly as claimed in claim 3, wherein the latch block defines a latch slot, the stopping block is latched in the latch slot.

11. The battery cover latching assembly as claimed in claim 5, wherein the elastic member is a waved sheet.

12. A battery cover latching assembly, comprising:
    a body member defining a battery receiving space, a groove, and a securing hole adjacent to the groove;
    a battery cover being attached to the body member to cover the battery receiving space, the battery cover including a stopping block; and
    a latching assembly being received in the groove, the latching assembly including a button and an elastic member, the button being an integral part and including a latch block and a securing portion integrally formed together, the latching block protruding from one end of the button and being releasably locked to the stopping block, the securing portion protruding from an opposite end of the button and being received in the securing hole, the button can be pressed to force the latch block to deflect around the securing portion and compress the elastic member to allow the latch block to be released relative to the stopping block.

13. The battery cover latching assembly as claimed in claim 12, wherein the groove is surrounded by a first wall, a second wall, and a third wall, the second wall is opposite to the first wall.

14. The battery cover latching assembly as claimed in claim 13, wherein the securing hole is defined in the first wall, the securing portion can be rotatably received in the securing hole.

15. The battery cover latching assembly as claimed in claim 13, wherein the latch block includes a wedge-shaped surface for guiding the stopping block to latch with the latch block.

16. The battery cover latching assembly as claimed in claim 13, wherein the latch block defines a latch slot, the stopping block is latched in the latch slot.

17. The battery cover latching assembly as claimed in claim 13, wherein a first clamp block protrudes from the connecting portion, the first clamp block and the button define a first clamp space for clamping one end of the elastic member.

18. The battery cover latching assembly as claimed in claim 17, wherein a second clamp block protrudes from the third wall, the third wall and the second clamp block define a second clamp space for clamping the other end of the elastic member.

19. The battery cover latching assembly as claimed in claim 17, wherein the third wall defines a channel, the first clamp block is moveably received in the channel.

20. The battery cover latching assembly as claimed in claim 12, wherein the elastic member is a waved sheet.

* * * * *